(12) United States Patent
Uiterwyk et al.

(10) Patent No.: US 6,219,087 B1
(45) Date of Patent: Apr. 17, 2001

(54) INTERACTIVE VIDEO COMMUNICATION IN REAL TIME

(75) Inventors: Robert E. Uiterwyk, Houston, TX (US); Stephen B. Greenway, N. Little Rock, AR (US)

(73) Assignee: Virtual Shopping, Inc., St. Paul, MN (US)

( * ) Notice: Subject to any disclaimer, the term of this patent is extended or adjusted under 35 U.S.C. 154(b) by 0 days.

(21) Appl. No.: 09/303,999

(22) Filed: May 3, 1999

(51) Int. Cl.[7] ........................................ H04N 7/14
(52) U.S. Cl. ........................ 348/14.08; 348/14.12; 379/202; 379/265
(58) Field of Search .................... 348/14, 15, 16; 370/260, 261, 259; 379/202, 265, 93.21

(56) References Cited

U.S. PATENT DOCUMENTS

| | | |
|---|---|---|
| 4,892,753 | 1/1990 | Wang et al. .............................. 427/38 |
| 5,036,535 * | 7/1991 | Gechter et al. ...................... 379/265 |
| 5,124,014 | 6/1992 | Foo et al. . |
| 5,495,284 | 2/1996 | Katz . |
| 5,621,789 | 4/1997 | McCalmont et al. . |
| 5,740,240 | 4/1998 | Jolissaint ............................... 379/265 |
| 5,774,663 | 6/1998 | Randle et al. . |
| 5,801,401 | 9/1998 | Forbes .................................... 257/77 |
| 5,825,869 | 10/1998 | Brooks et al. ........................ 379/265 |
| 5,894,512 | 4/1999 | Zenenr ................................. 379/265 |
| 6,046,762 * | 4/2000 | Sonesh et al. ..................... 379/93.21 |

FOREIGN PATENT DOCUMENTS 0843454  11/1997  (EP) ............................... H04M/3/50

* cited by examiner

*Primary Examiner*—Duc Nguyen
*Assistant Examiner*—Melur Ramakrishnaiah
(74) *Attorney, Agent, or Firm*—Schwegan, Lundberg, Woessner & Kluth, P.A.

(57) ABSTRACT

The present invention includes a system for providing personal financial services utilizing video conferencing between a consumer and a services provider at a location remote from the consumer. The system comprises a call distributor mechanism for receiving requests from the consumer and for responding to requests based upon semantics communicated by the consumer.

36 Claims, 3 Drawing Sheets

INTERACTIVE VIDEO COMMUNICATION IN REAL TIME

FIELD OF THE INVENTION

The present invention relates to a system and to a process for providing personal financial services utilizing video conferencing between a customer and a service provider at a location remote from the customer.

BACKGROUND OF THE INVENTION

Financial services have traditionally been provided in face-to-face meetings between a financial services provider, such as a banker and a customer. Typically, the customer traveled to the bank or other financial service center to meet with the financial service representative. The location of the financial service center has frequently, not been in a location which has been very convenient for the customer to use. However, once the customer arrived at the service center, the customer could speak to a single financial services representative and obtain information in a variety of areas related to financial services, products and other information typically provided by a banker or other financial services provider.

In addition to being frequently inconvenient for the consumer, this arrangement has not been advantageous for the financial institution either. In particular, it has not been efficient, or cost effective, for a bank or financial service institution to have a branch office staffed with consultants and experts in various aspects of banking and other financial services. Typically, these experts and consultants are not providing services at all times. This "dead" time has been inefficient and costly to the financial services business.

Banks and other financial institutions have made an effort to reduce costs by use of technology. In particular, banks frequently employ automatic teller machines, ATMs. Banks may also provide limited information that can be accessed by a consumer from a home phone or personal computer. This limited information is typically in the nature of account balances. Other financial services companies, such as stock and bond brokerage houses, also have personal computer access to their consumers.

While the ATM and personal computer based services permit a customer to perform some financial service activities at home, 24 hours a day, the quantity and quality of information provided is very limited. This technology does not provide advice which is tailored to a consumer specific need, such as specific lending information or mortgage information. Furthermore, this type of service does not allow for visual or audio contact with a living being. Because of the history of the financial services industry, and the personal nature of services that have been historically provided, the use of the electronic-based technology has tended to erode trust between the consumer and the financial institution.

Use of video conferencing technology has received some consideration by financial services in recent years. Video conferencing potentially provides face-to-face contact between the financial service provider and the customer. The difficulty has been in connecting a consumer with the appropriate financial service representative, without wasting the consumer's time and without interrupting business under consideration by the financial service representative.

U.S. Pat. No. 5,774,663 issuing Jun. 30, 1998 describes a system for providing banking services via video in real time to a customer by connecting with one of a plurality of remote locations from among a plurality of bankers at a central location or other locations. The system includes at least one customer kiosk at a remote location. The kiosk has a video camera and a video screen, a mechanism for receiving customer input, and a mechanism by which a customer can register a request for video connection to a banker. A link is provided that connects the customer kiosk to a central information processor containing information and data files regarding the customer's account and the bank services, products and information. A second communication link is provided that connects the central information processor to a banker's terminal. A video communication link is provided that connects the banker's terminal to the customer kiosk and vice versa. A call distributor connects the customer to the banker by video by way of a sequence of direct connection to an available banker, or holds in queue for attention by a next available banker, or transfers the call and identifies the kiosk from which the customer's request for video connection to a banker was initiated. The system is used so that when the banker's terminal receives the customer's request for video connection to a banker, the banker's terminal effects a video connection over the video communication link between the banker's terminal and the customer kiosk to enable a real time video conference between the customer and banker.

SUMMARY OF THE INVENTION

One embodiment of the present invention includes a system for providing personal financial services utilizing video conferencing between a consumer and a services provider at a location remote from the consumer. The system comprises a plurality of consumer access stations. Each access station comprises a video camera or other image generating device, and a video screen or other image receiving device, by which a consumer can access a call distributor mechanism and request a video conversation with the service provider. The system also includes a call distributor mechanism for receiving requests from the consumer and for responding to requests based upon semantics communicated by the consumer. The semantics are received and are interpreted by the call distributor mechanism. The system further includes a plurality of service provider stations, each station having a video camera or other image generating device, a video screen or other image receiving device and a mechanism for receiving a signal from the call distributor. The mechanism comprises information regarding the type of transaction and information regarding expertise of the service provider. The call distributor directs the consumer call to a suitable service provider. In one embodiment, the service provider has an option of accepting or refusing the consumer's call.

Another embodiment of the present invention includes a process for providing personal financial services utilizing video conferencing between a customer and a services provider at a location remote from the customer. The process comprises providing a plurality of consumer access stations. Each access station comprises a video camera or other image generating device, a video screen or other image receiving device or other mechanism by which a consumer can access a call distributor and request a video conversation with the service provider.

The process also includes providing a call distributor mechanism for receiving requests from the consumer and for responding to requests based upon semantics communicated by the consumer and received and interpreted by the call distributor. The process further includes providing a plurality of service provider stations, each having a video camera or other image generating device, a video screen or other image receiving device and a mechanism for receiving a signal from the call distributor. The signal includes information regarding the type of transaction and wherein the service provider has an option of accepting or refusing the consumer's call.

DETAILED DESCRIPTION OF EMBODIMENTS

Figure 1:
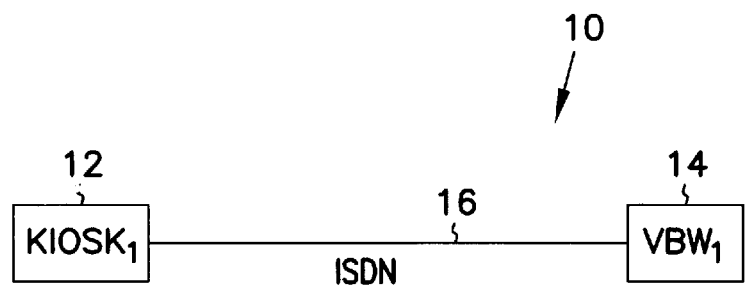
FIG. 1, is a prior art schematic view of point-to-point video conferencing using ISDN telephone service as a transport mechanism.

The software implementing the various embodiments of the present invention is a computer readable medium that may be implemented by computer programs of machine-executable instructions written in any number of suitable languages and stored on machine or computer readable media such as disk, diskette, RAM, ROM, or other device commonly included in a personal computer.

Methods of transferring or distributing calls may comprise computer programs written to perform the methods on a personal computer. Computer programs run on a central processing unit out of main memory, and may be transferred to main memory from permanent storage via disk drive when stored on removable media or via a network connection or modem connection when stored outside of the personal computer, or via other types of computer or machine readable medium from which it can be read and utilized. The computer programs comprise multiple modules or objects to perform methods described herein. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as are well known to those skilled in the art.

One embodiment of the present invention includes a method for receiving and directing video conferencing requests from one or more customers having access to video conferencing devices to one or more qualified financial service representatives, located remote from the customers, the qualified financial services representative, also having access to video conferencing devices, wherein the qualified financial services representative has an ability to accept or decline a call from a consumer and wherein the consumer call is redirected to another qualified financial services representative.

As used herein, the term Video Conferencing Devices refers to a video camera or other image generating device, a video screen or other image receiving device, and a microphone or other device for audio communication.

ISDN telephone line as used herein refers to an integrated service digital network telephone line.

The term "VBW" as used herein refers to a "Video Banking Workstation," which includes a video camera or other image generating device, a video screen or other image receiving device and a microphone or other device for audio communication.

The term "POTS" as used herein refers to "Plain Old Telephone Service."

The term "ACD" as used herein refers to "Automatic Call Distributors."

The term "VTM" as used herein refers to "Customers."

The term "CQP" as used herein refers to "Call Queue Protocol."

The term "ZCM" as used herein refers to a "Call Manager."

"Kiosk" as used herein refers to any site of a video conferencing system.

In traditional video conferencing systems, an enclosure, such as a kiosk, is located at a site which is remote from a location of a financial services representative or a banker. The kiosk or other enclosure houses video conferencing devices. The system of the present invention is usable with the kiosk.

It is also contemplated that the video conferencing system used in the system of the present invention may be comprised of elements of a personal computer. The personal computer may be accessed in a location such as a home.

In one embodiment, each of the video conferencing systems is connected to an ISDN telephone line. At the financial service representative's or banker's location, another computer is connected to the ISDN telephone line creating a system having a capability for permitting a consumer to remotely contact the banker or financial service representative by video conferencing. While ISDN is described, it is understood that any interface that comprises a line capable of high speed digital video signal transmission is suitable for use.

This type of prior art configuration is illustrated schematically at 10 in FIG. 1. As can be seen, this configuration is a point-to-point system. In particular, a video conferencing device in a kiosk 12 calls a specific video banking workstation, VBW 14. The kiosk 12 and VBW 14 points are connected by the ISDN telephone service 16. With this system, if the VBW 14 is busy, or if a living banker is not present, the consumer 12 cannot conduct a video conference.

The limited system of FIG. 1 can be expanded somewhat by providing the kiosk (12) with a series of roll numbers, i.e.

telephone numbers, so that a busy signal at one VBW 14 does not translate into a wait state because other banking stations may be called by the consumer.

One disadvantage of the use of the roll numbers is that call logic is pushed out to the kiosk 12 and away from a separate call control center. In fact, this call control center is not a component of the system shown in FIG. 1. In systems utilizing audio conferencing only, this use of roll numbers has been the predominant system.

Figure 2:
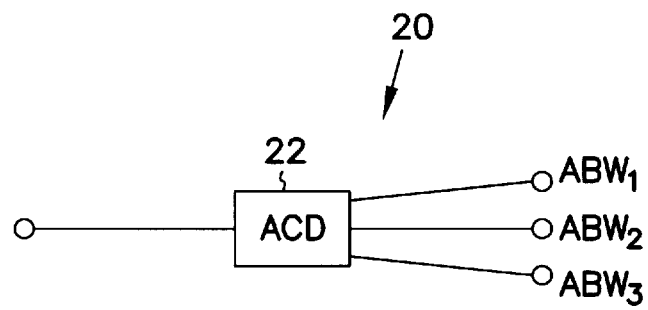
FIG. 2, is a schematic prior art view of a point-to-point system for connecting a customer to a financial services representative.

A prior art system with greater flexibility is illustrated at 20 in FIG. 2. The system 20 includes an automatic call distributor 22 that controls the routing of POTS audio calls. A system such as is shown in prior art FIG. 2, has wide use by credit card companies, banks, airlines and other businesses requiring a concentration and distribution of inbound calls. The specific automatic call distributor equipment used in this type of system tends to be usable only with particular telephone switch designs. Consequently, if a business has a particular type of telephone system installed in its organization, it can only use a call distributor that is adapted for use with that telephone system.

Figure 3:
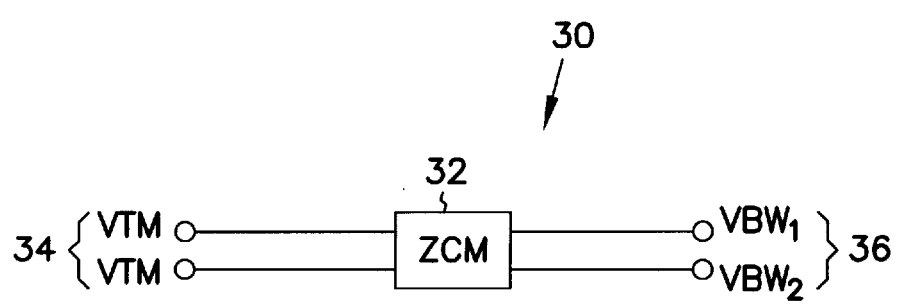
FIG. 3, is a schematic view of the call distributor of the present invention in a passive role.

The call distribution system of the present invention is capable of operating on any computing platform, such as Microsoft® Win32-based computing platform, including Windows '95®, Windows '98®, and Windows NT®. One embodiment of the call distribution system of the present invention is illustrated schematically at 30 in FIG. 3. With this embodiment, a call distributor 32 is used as a phone book by customers, identified herein as VTMs, at 34. The VTMs make point-to-point calls to financial service representatives, identified herein as VBWs as shown at 36 in FIG. 3. In particular, a VTM contacts the call distributor 32 with a request to video conference with a VBW 36. The VTM also communicates conference semantics with the request.

The call distributor 32 is preprogrammed to categorize the nature of the call based upon the semantics. The call distributor 32 then makes routing decisions based upon parameters defined in software designed for control of the call distributor. For instance, if a call request for a consumer loan is made, the call distributor 32 is configured to route such a call to a particular VBW with lending expertise first and then, based upon a configurable routing scheme, to a second VBW with lending expertise, if necessary. This type of routing is referred to as skills-based routing. With this routing scheme, financial service representatives proficient in certain areas receive the calls commensurate with their skill level.

Figure 4:
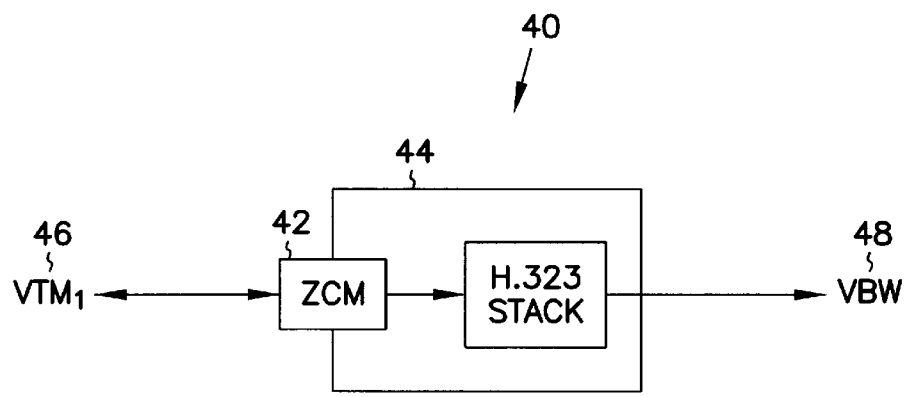
FIG. 4, is a schematic view of the call distributor of the present invention in an active role wherein the distributor receives and transfers calls from a customer or financial services representative to a customer or financial services representative.

In one other embodiment of the call distributor system of the present invention, the call distributor 42 is an active director as a result of implementing a stack 44 such as a H.323 stack. With this embodiment, illustrated generally at 40 in FIG. 4, a VTM 46 calls the call director 42. The initial call is routed without a need for point-to-point call control from the VTM 46 to a VBW 48. With this system, the call director 42 is a centralized control point for all calls. With this level of control, the call director 42 may be used to communicate on-hold data streams. For instance, the call director may transmit streaming video to the VTM 46 advertising certain targeted banking products while the customer is waiting. In addition, the call distributer 42, in one embodiment, relies upon the VTM 46 and the VBW 48 to maintain and transmit call metrics, such as call duration, call status and so on.

The second generation call distributor 42, by virtue of being part of the call, may procure all the necessary call information allowing call center managers to perform a statistical analysis. With this embodiment, the statistics gathering functionality is concentrated in the call distributor 42. The call distributor 42 utilizes software such as the semantics-based software to catagorize calls and gather data for statistical analyses.

Figure 5:
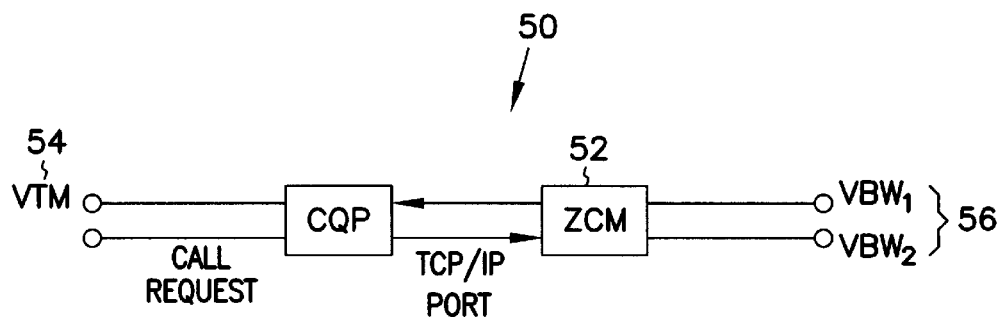
FIG. 5, is a schematic view of one other call transfer system wherein the call distributor of the present invention has an active role.

In one embodiment of the call distributor system of the present invention, illustrated generally at 50 in FIG. 5, the call distributor 52 communicates with a VTM 54 under a protocol referred to herein as a call queue protocol. The call queue protocol is formulated by software which comprises a Level 7 specification in layers of an OSI model and is therefore an application-to-application protocol that is transport-independent.

Initially, the call distributor accepts call queue protocol sessions using TCP/IP ports. It is contemplated that the call distributor may accept call queue protocol sessions via other network protocols such as IPX, net bios, or other mechanisms such as T. 120 data conferences. Call queue protocol sessions are established by VTMs 54 for the purpose of submitting inbound call requests and by VBWs 56 for transmitting status information and servicing call queues.

In one call distributor embodiment, all VTMs 54 and VBWs 56 connecting to a distributor server must be CQP aware. It is contemplated that the call distributor is comprised of components that service non-CQP calls and also service CQP calls.

For some embodiments of the call distributor system, the system is not able to facilitate a seamless transfer of calls because the call distributor never actually participates in a conference with a client. The call distributor accepts a client or VTM's desire to conference with an agent or VBW, and instructs either the client to contact a particular agent, or the agent to contact a particular client, which is known as a callback. Using callbacks, the call distributor provides a firewall for agents by allowing the agents to initiate only outbound calls and ignore direct inbound calls.

Another embodiment where callbacks are not used comprises using a scheme known as a limited window firewall. When the call distributor is ready to connect an agent and a client, the call distributor instructs the agent to create a conference with a unique system generated name. The name is transmitted to the client. The client then attempts to contact the agent with the specific and secret conference name. This format provides the agent with some degree of protection against direct conference requests from clients attempting to circumvent the call distributor. A specific mode of fire walling outbound calls only or limited window is a configurable option.

Figure 6:
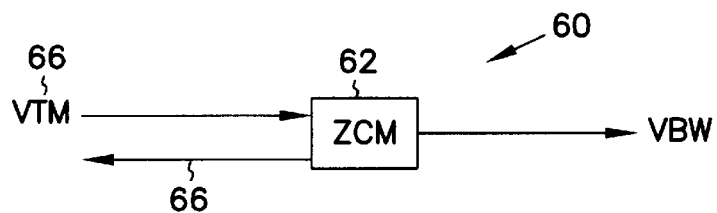
FIG. 6, is a schematic view of another embodiment of the call transfer system of the present invention wherein the call distributor interacts with the consumer.

In an embodiment illustrated generally at 60 in FIG. 6, a call distributor 62 creates a single listening thread 64 on a port utilizing a specification that defines a network programming interface for software such as Microsoft Windows which is based on the "socket" paradigm popularized in the Berkeley Software Distribution (BSD) from the University of California at Berkeley.

The Windows Sockets specification, WinSock, provides a single API to which application developers can program and multiple network software vendors can conform. The specification defines a binary interface (API) such that an application written to the Windows Sockets API can work with a conformant protocol implementation from any network software vendor. The specification thus defines the library calls and associated semantics to which an application developer can program and which a network software vendor can implement. In one embodiment of the present invention, a VTM 66 uses WinSock specifications, or some component utilizing WinSock specifications, to call the call distributor 62.

Figure 8:
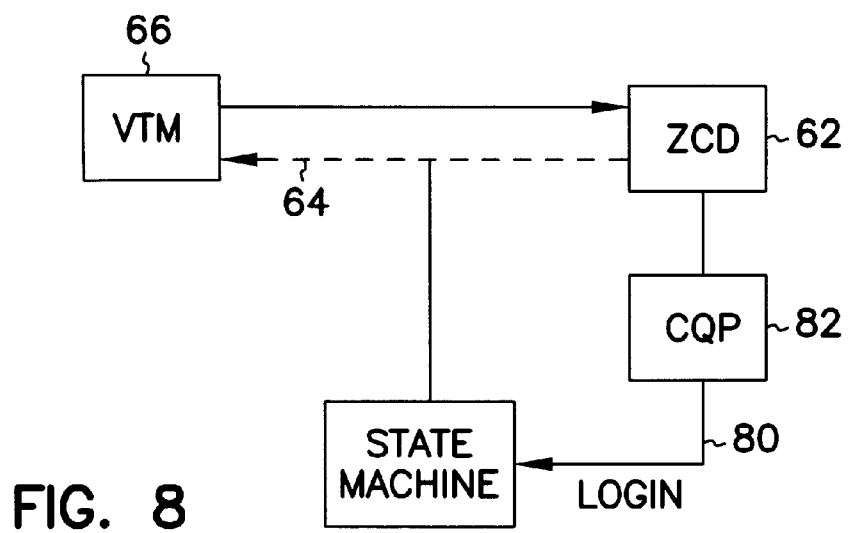
FIG. 8, is a schematic view of another embodiment of the video conferencing system of the present invention, wherein the call distributor is activated by a connection request from a consumer.

When a connection request is received, the call distributor 62 spawns a subordinate thread 64 to service the connection and to return to a listening state. The subordinate thread serves as a state machine, illustrated at 80 in FIG. 8, and a servicing mechanism for the connection. When the subordinate thread 64 is created, the thread transmits a connection string to the VTM 66. The subordinate thread 64 is delayed for a period of time to receive a login command from the CQP 82. If a configurable period of time expires without a valid CQP exchange, the thread 64 closes the connection and terminates.

From a perspective of the call distributor 62, there are three types of connections that are serviced by the call distributor: consumer connections, financial services advisor connections and administrator connections. Consumers submit inbound call requests. Financial service providers service the calls and administrators configure or monitor the call distributor apparatus.

Figure 7:
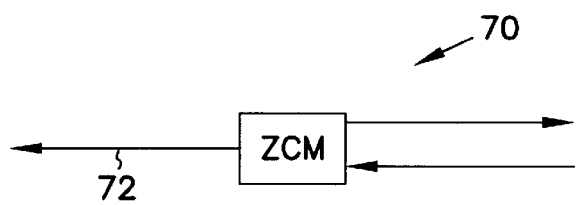
FIG. 7, illustrates a schematic view of another embodiment of the interactive video conferencing system of the present invention, wherein the call distributor has an interactive role with the financial services representative.

In one embodiment, illustrated at 70 in FIG. 7, on initial connection, a process is initiated for identifying valid consumers via a login. Upon successful authentication of the login, the consumer is given an appropriate rights token 72. The consumer's rights token limits the range of acceptable call distributor directives. However, CQP is a clear-text protocol, meaning all commands are transmitted unencrypted. This protocol poses a particular security risk for some applications which may be addressed through encryption in the future to protect the call distributor from being compromised.

Figure 9:
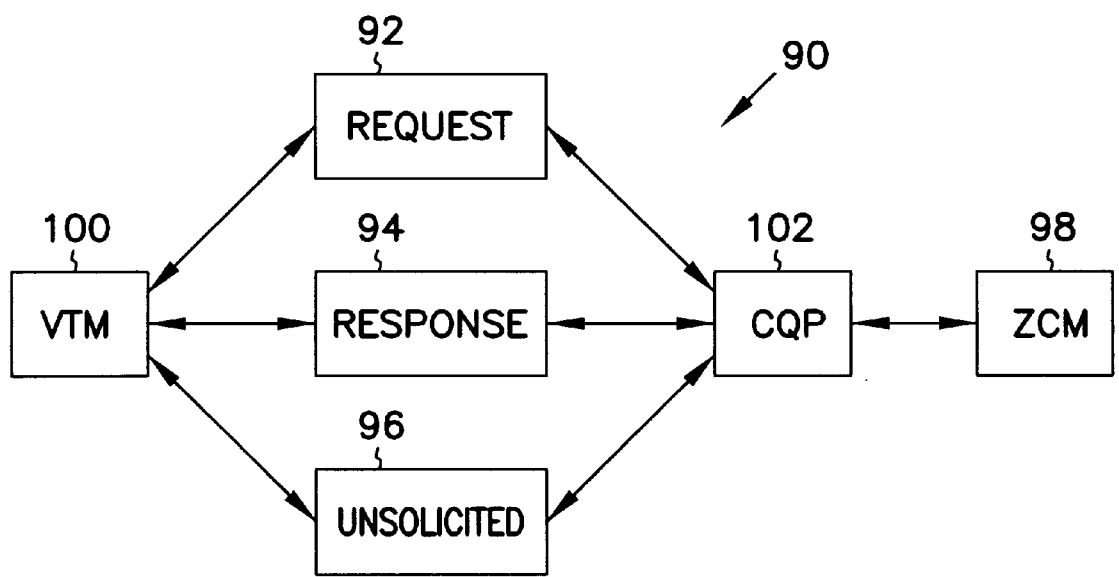
FIG. 9, is a schematic view of one other embodiment of the video conferencing system of the present invention wherein the call distributor interacts with a consumer with options of "request", "response" "unsolicited."

The CQP defines three types of packets illustrated at 90 in FIG. 9 which are request packets 92, response packets and event packets 96. The packets may be transmitted to and from the call distributor 98. The request packets 92 communicate some form of directive. Response packets 94 are transmitted in response to requests. Event packets 96 are unsolicited messages that communicate state information. For instance, the call distributor 98 transmits an event zero packet to a consumer 100 when an initial connection is made. The consumer 100 transmits a login request packet to the call distributor 98 which then transmits a response packet 94 containing the outcome of the login request.

Call queues 102 are established in communication with the call distributor 98 by configuring a list of categories which define the services offered by the site, such as consumer loans or technical support. Using CQP 102, the consumer may access a list of available categories for conferencing sessions. In addition, agents may be assigned to service particular categories or groups of categories. A priority scheme is also implemented which enables codes to be assigned and transmitted to clients. These priority codes can be used by clients to route their calls based on the semantics of the code. For instance, a priority code when used, could direct the call distributor 98 to always route a call to a specific agent, or a priority code could direct the call distributor 98 to place a call in a particular ordinal position in the requested queue.

On the administrative side, CQP can be used to monitor or configure the control distributor 98. In one embodiment, the control distributer 98 may translate audio speech from the consumer and communicate with consumers in the web using hyper text transport protocol (http).

It is contemplated that the control distributor may be incorporated into a web site and provide real time interactive video communication using the embodiments described herein between consumers having video conferencing devices and service providers having video conferencing devices.

It is to be appreciated that the method and memory circuit of the present invention have been described in particular detail with respect to preferred processes and structures. The present invention, however, is not intended to be limited to these preferred embodiments. One skilled in the art will readily recognize that the actual method and system may be adjusted to accommodate particular conditions.

What is claimed:

1. A system for providing personal financial services utilizing real time video conferencing between a consumer and a service provider, or multiple service providers, at a location, or at multiple locations, remote from the consumer, comprising: a call distributor mechanism, which is transport and hardware/computer platform independent, for receiving calls from the consumer and for responding to calls based upon semantics communicated by the consumer and received and interpreted by the call distributor wherein calls from a consumer are routed based upon expertise of the service provider and wherein a call from a consumer is configured to route to a first qualified service provider and then to a second qualified service provider, if necessary; a mechanism wherein the call distributor procures and stores information from call semantics for performance of statistical analyses; one or more consumer access stations, each access station comprising an image generating device, and an image receiving device, by which the consumer can access the call distributor and request a video conversation with the service provider; and one or more service provider stations, each having an image generating device, and image receiving device and a mechanism for receiving a signal from the call distributor that comprises information regarding the type of transaction.

2. The system of claim 1 and further comprising a routing mechanism wherein the call distributor receives the consumer call without prior routing to a service provider.

3. The system of claim 1 and further comprising a mechanism by which the call distributor transmits a data stream to a consumer when the consumer is on hold.

4. The system of claim 1 wherein the call semantics interpretation and data collection is performed substantially exclusively by the call distributor.

5. The system of claim 1 wherein the call distributor receives calls from a call queue protocol as well as calls made outside of a call queue protocol.

6. The system of claim 1 wherein the call distributor instructs the service provider to create a conference name prior to connection with a consumer.

7. The system of claim 6 wherein the conference name is transmitted to the consumer.

8. The system of claim 1 wherein the call distributor creates a listening thread between a consumer and the call distributor when a request for connection is received from the consumer.

9. The system of claim 8 wherein the thread transmits a connection string to the consumer and waits for a login command.

10. The system of claim 1 wherein the call distributor receives connection requests from the consumer, the service provider, and administrators that configure or monitor the call distributor apparatus.

11. The system of claim 1 wherein consumer calls are received by the call distributor after organization by a call queue protocol.

12. The system of claim 11 wherein the call queue protocol defines three types of information bundles which are transmitted to and from the call distributor.

13. The system of claim 12 wherein the information bundles comprise request information bundles which communicate a directive, response bundles which are transmitted in response to requests and event bundles which are unsolicited messages that communicate general information.

14. A process for providing personal financial services utilizing real time video conferencing between a consumer and a qualified service provider, or multiple service providers, at a location, or at multiple locations, remote from the consumer, comprising: providing a call distributor mechanism, which is transport and hardware/computer platform independent, for receiving requests from the consumer and for responding to requests based upon semantics communicated by the consumer and received and interpreted by the call distributor wherein the call distributor procures and stores information from call semantics for performance of statistical analyses; providing one or more consumer access stations, each access station comprising an image generating device and an image receiving device by which the consumer can access the call distributor and request a video conversation with a qualified service provider; and directing a call received from the consumer to the qualified service provider based upon semantics received and interpreted by the call distributor wherein a call from a consumer is routed based upon expertise of the service provider and wherein the call is configured to route to a first qualified service provider and then to a second qualified service provider, if necessary.

15. The process of claim 14 and further comprising routing a call from the consumer without prior routing to a service provider.

16. The process of claim 14 and further comprising communicating a data stream to the consumer when the consumer is on hold, by the call distributor.

17. The process of claim 14 wherein the call semantics interpretation and data collection is performed substantially exclusively by the call distributor.

18. The process of claim 14 wherein the call distributor receives calls from a call queue protocol as well as calls made outside of a call queue protocol.

19. The process of claim 14 and further including creating a conference name prior to connection with a consumer.

20. The process of claim 19 wherein the conference name is transmitted to the consumer.

21. The process of claim 14 and further comprising fabricating a listening thread between the consumer and the call distributor when a request for connection is received from the consumer.

22. The process of claim 21 wherein the thread transmits a connection string to the consumer and waits for a login command.

23. The process of claim 14 wherein the call distributor receives connection requests from the consumer, the service provider, and administrators that configure or monitor the call distributor apparatus.

24. The process of claim 14 and further comprising receiving calls by the call distributor after organization by a call queue protocol.

25. The process of claim 24 wherein the call queue protocol defines three types of information bundles which are transmitted to and from the call distributor.

26. The process of claim 25 wherein information bundles communicate a directive, response bundles respond to requests and event bundles that communicate general information.

27. The process of claim 14 wherein the call distributor communicates with consumers using hypertext transport protocol.

28. A machine readable medium comprising machine readable instructions for causing a call distributor to perform a method of routing a call, which is transport and hardware/computer platform independent, comprising: an instruction for categorizing the call based upon semantics of the call; an instruction for routing the categorized call comprising configuring a call from a consumer to route to a first qualified service provider and then to a second qualified service provider, if necessary and further comprising routing calls from the consumer based upon expertise of the service provider; and an instruction wherein the call distributor procures and stores information from call semantics for performance of statistical analyses.

29. The medium of claim 28 and further comprising an instruction for communicating on-hold data streams by the call distributor.

30. The medium of claim 28 and further comprising an instruction for gathering data utilizing semantics of the call.

31. The medium of claim 28 and further comprising an instruction for communicating with a consumer under a call queue protocol.

32. The medium of claim 28 and further comprising an instruction wherein the call distributor instructs a consumer to create a conference with a system generated name.

33. The medium of claim 28 and further comprising an instruction wherein the call distributor generates a thread to service a connection with a consumer.

34. The medium of claim 33 wherein the call distributor returns to a listening state after generating the thread.

35. The medium of claim 33 and further comprising an instruction wherein the thread generation is delayed to receive a login command from a call queue protocol.

36. The medium of claim 33 and further comprising an instruction wherein the call distributor communicates with consumers using hypertext transport protocol.

* * * * *